United States Patent [19]
Marsilio et al.

[11] Patent Number: 5,772,028
[45] Date of Patent: Jun. 30, 1998

[54] VIDEO CASSETTE STORAGE CONTAINER

[75] Inventors: Ronald M. Marsilio, Mogador; James T. Weisburn, Massillon; Ronald K. Burdett, Strasburg; Christopher G. Gallagher, Akron, all of Ohio

[73] Assignee: Alpha Enterprises, Inc., North Canton, Ohio

[21] Appl. No.: 729,355

[22] Filed: Oct. 16, 1996

Related U.S. Application Data

[60] Provisional application No. 60/012,199 Feb. 23, 1996.

[51] Int. Cl.[6] ............................................. B65D 85/672
[52] U.S. Cl. .................. 206/387.1; 206/472; 206/387.13
[58] Field of Search ............................ 206/387.1, 387.13, 206/387.14, 472, 473; 220/4.22, 4.23

[56] References Cited

U.S. PATENT DOCUMENTS

| | | | |
|---|---|---|---|
| 4,293,266 | 10/1981 | St. Lawrence et al. | 206/387.13 |
| 4,962,854 | 10/1990 | Ricci | 206/387.1 |
| 5,016,752 | 5/1991 | Haugen, Jr. | 206/472 |
| 5,161,907 | 11/1992 | Byrne | 206/387.13 |

FOREIGN PATENT DOCUMENTS

| 9015001 | 12/1990 | WIPO | 206/387.13 |
|---|---|---|---|

*Primary Examiner*—David T. Fidei
*Attorney, Agent, or Firm*—Sand & Sebolt

[57] ABSTRACT

An improved video cassette storage container includes a lid hingedly mounted to a base and movable between open and closed positions. The hinge provides a rounded outer spine and the base and lid have smooth curved radiused edges to provide an attractive and sleek external configuration. The peripheral walls of the base and lid are substantially equal in height and form a centrally located closure line when the container is in the closed position. A front wall of each of the base and lid is recessed to form an overhang portion to facilitate opening of the storage container. A pair of parallel spaced guide rails extend from an inner surface of the lid and center a VHS tape as the tape slides into the storage container during loading and packaging thereof. A plurality of ramped ribs extend from a pair of end walls and front wall of the lid to provide a camming surface which assists in guiding the tape between the guide rails. A third guide rail is formed on an inner surface of the base and a plurality of ribs are formed on a pair of end walls and the front wall of the base to center the tape within the storage container when the storage container is in the closed position. The guide rails and ribs of the base and lid centrally retain the tape within the storage container and prevent the sliding of the tape therefrom regardless of which of the base or lid is moved to the open position relative to the other of the base or the lid. The hinge includes a pair of wall portions which are complementary shaped to the end walls of the base and lid and ensure closure of the container regardless of how the container is closed.

27 Claims, 10 Drawing Sheets

VIDEO CASSETTE STORAGE CONTAINER

CROSS-REFERENCE TO RELATED APPLICATION

This application claims the benefit of U.S. Provisional Application No. 60/012,199, filed Feb. 23, 1996.

BACKGROUND OF THE INVENTION

1. Technical Field

The invention relates to a storage container and, in particular, to a storage container for a video cassette. Even more particularly, the invention relates to a video cassette storage container formed as a one-piece member of polypropylene, having a smooth outer contour and configured side walls and hinge area to provide an extremely aesthetically pleasing and efficient storage container, and having guide rails and ramps on an inner surface thereof which automatically centers the video cassette and its associated literature into the storage container during automated and/or manual packaging of the cassette for sale.

2. Background Information

Numerous containers for various articles, including video cassette tapes, have been developed, usually of plastic materials, such as shown in U.S. Pat. Nos. 4,291,801, 4,363,403, 4,365,711, 4,407,410, 4,635,797 and 4,784,264. Although these prior art storage containers are satisfactory for their intended purposes, many are made of various types of plastics, such as crystal polystyrene, which is brittle and subject to breakage, and when molded will have a square appearance with straight edges terminating in sharp corners and edges. In other containers, the closure mechanism occupies space within the storage compartment, increasing the overall size of the container. Likewise, the hinge assembly of many prior art containers requires that the containers be closed in a single fashion and not readily accomplished by small children who increasingly use these storage containers for storing family entertainment cassettes.

Likewise, many of the prior art storage containers are difficult to open by children, since their small hands are unable to grip the entire outer cover and base for pulling the container apart in order to gain access to the video cassette stored therein.

Further, the video cassettes and associated literature must be carefully centered in these prior art storage containers, especially during automated packaging of the video cassettes. If the video cassettes are not centered correctly within the container, the container will not close properly prior to being shrink-wrapped for sale. During the automated packaging of the video cassettes, the cassettes slide into the storage containers as the storage containers travel along a conveyor belt. The storage containers are automatically closed and shrink-wrapped for subsequent shipment and sale. The conveyor belt must move at a relatively slow speed to allow an operator to properly center the video cassettes within the storage containers to permit the closure thereof.

Thus, the need exists for an improved video cassette storage container which can be formed as a one-piece member of a lightweight plastic such as polypropylene, which provides an attractive appearance and is easily used by small children for storing video cassettes, which has rounded sides with radiused edges, and a rounded spine formed by the hinge assembly to provide an attractive appearance, and which provides sufficient space for displaying graphics to provide an attractive point of sale container, and which automatically guides and centers the video cassette and associated literature in the storage container during the packaging thereof.

SUMMARY OF THE INVENTION

Objectives of the invention include providing an improved video cassette storage container formed as a one-piece member of plastic with the sides thereof having radiused rounded edges, and a rounded spine formed by a double living hinge panel assembly to provide an attractive and compact storage container.

A further objective of the invention is to provide such a storage container in which the latch mechanism that maintains the storage container in a closed position is achieved by a small pair of nubs formed on one of the half-wall members which seat into a complementary-shaped pair of recesses formed in an opposite half-wall member of the container.

A still further objective of the invention is to provide such a storage container in which central portions of the front wall of the base and lid are slightly recessed to provide larger overhang areas on the base and lid which can be easily grasped by a child to open the storage container without affecting the size of the container and its attractive appearance.

Another objective of the invention is to provide such a storage container having a unique end wall configuration at the ends of a concavely curved hinge panel which enables the base and lid to be moved into a closed position irrespective of the manner of movement of the base, lid or hinge assembly.

Another objective of the invention is to provide such a storage container in which a plurality of positioning ribs and guide members are formed integrally on the inside surfaces of either the base or lid walls and main panel thereof to define an area for receiving the video cassette, irrespective of its manner of placement between the positioning ribs, and which will prevent the cassette from moving or rattling within the storage compartment formed by the container when in its closed position.

A still further objective of the invention is to provide such a storage container in which the front and end walls of the base and lid are equal in height, with one of the closure members having a stepped shoulder and an extending recessed wall portion for aligning with the edges of the end and front walls of the corresponding container member when in the closed position.

A further objective of the invention is to provide such a storage container in which the front corners of the base and lid are rounded and align with each other when in the closed position to provide an attractive streamlined appearance, individually and in combination with the rounded spine provided by the double hinge panel assembly.

Another objective of the invention is to provide such a storage container which automatically guides and centers the video cassette and literature in the storage container when the video cassette and literature are loaded therein, either manually or automatically for packaging and shipment.

A still further objective of the invention is to provide such a storage container in which a pair of spaced guide rails and a plurality of ramped ribs are formed on the inner surface of one of the base or lid to facilitate the automatic guiding and centering of the video cassette and literature in the storage container.

Still another objective of the invention is to provide such a storage container wherein its overall size is larger than a VHS tape to be stored therein in order to provide increased surface areas for graphics which advertise the contents of the stored cassette tape.

These objectives and advantages are obtained by the improved video cassette storage container of the present invention, the general nature of which may be stated as including a base having a bottom wall, a pair of spaced end walls and a front wall, a lid hingedly mounted on the base and movable between open and closed positions on said base, said base and lid forming a storage chamber therebetween when in the closed position, and guide means formed on certain of the walls of the lid and extending into the storage chamber for guiding the article into the storage chamber.

BRIEF DESCRIPTION OF THE DRAWINGS

Preferred embodiments of the invention, illustrative of the best modes in which applicants have contemplated applying the principles, are set forth in the following description and are shown in the drawings.

Similar numerals refer to similar parts throughout the drawings.

DESCRIPTION OF THE PREFERRED EMBODIMENTS

Figure 1:
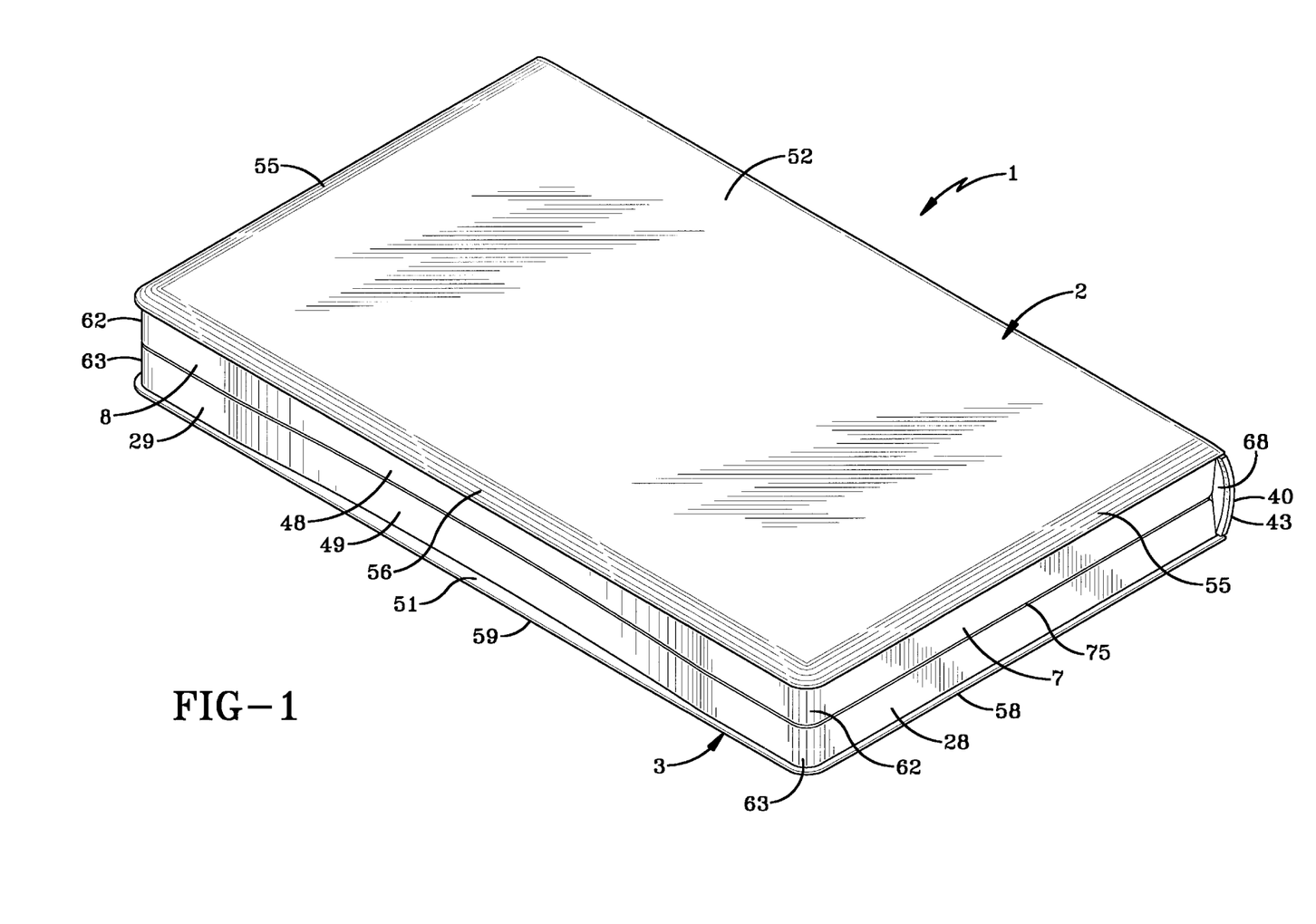
FIG. 1 is a perspective view showing the video cassette storage container of the present invention in closed position.
Figure 2:
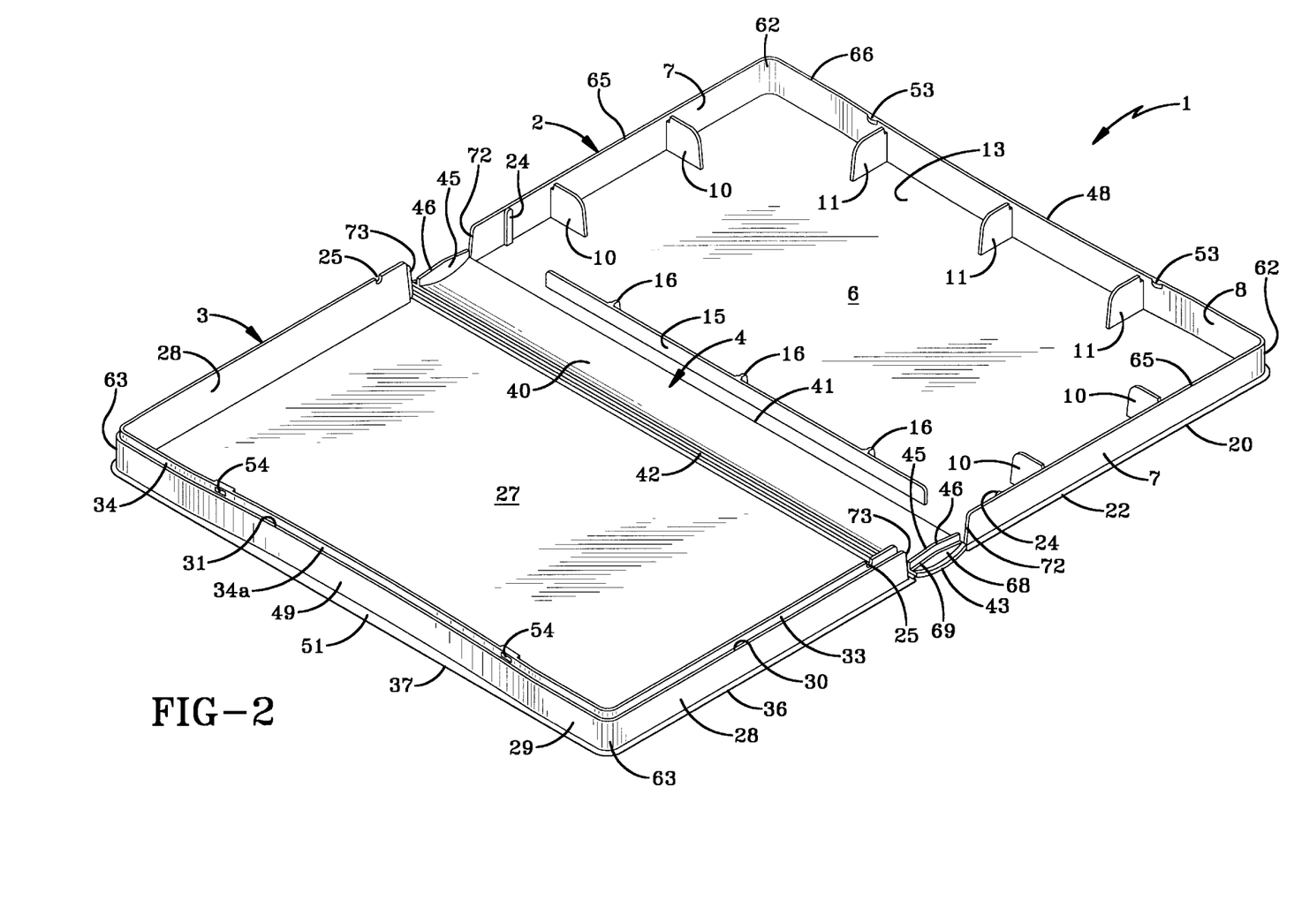
FIG. 2 is a perspective view of the storage container of FIG. 1 in full open position.
Figure 3:
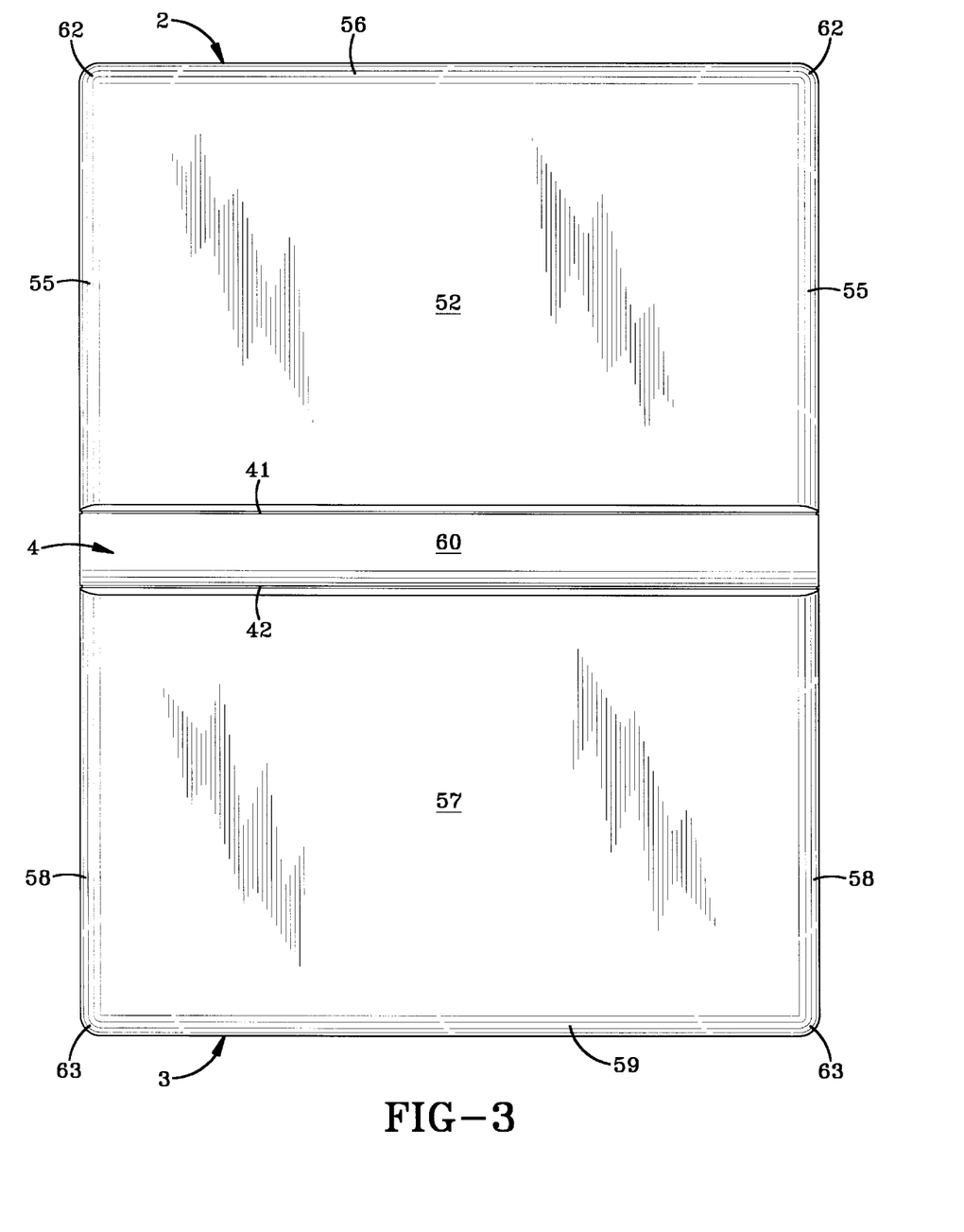
FIG. 3 is a plan view of the outer surface of the storage container in full open position.

The improved video cassette storage container of the present invention is indicated generally at 1, and is shown in a closed position in FIG. 1, and in a full open position in FIG. 2. Container 1 includes a base and closure lid, indicated generally at 2 and 3, respectively, which are hingedly connected together by a hinge assembly 4 for movement between an open position, as shown in FIG. 2, and a closed position, as shown in FIG. 1.

Figure 6:
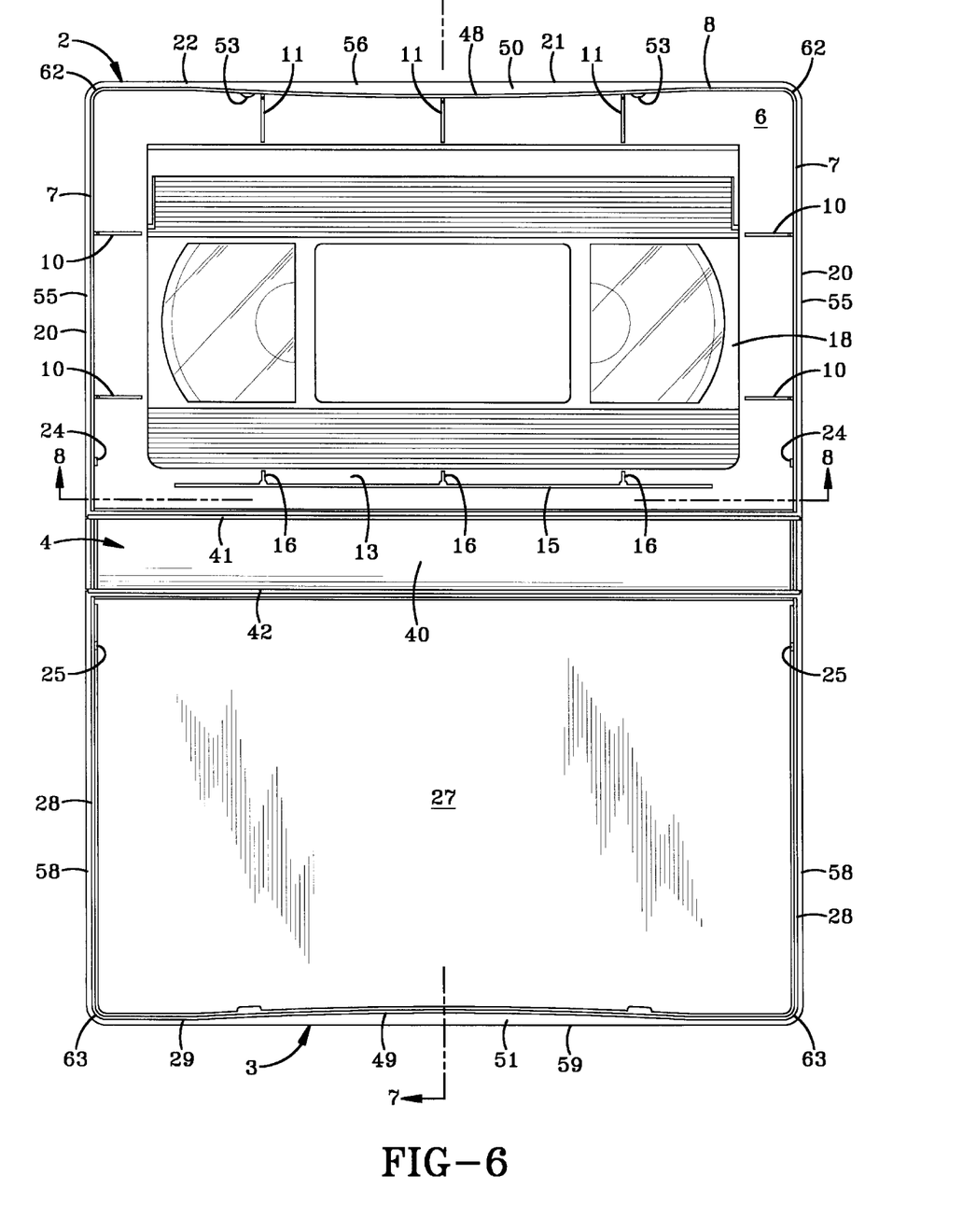
FIG. 6 is a reduced plan view of the storage container shown in open position as in FIG. 2, with a video cassette shown stored therein.

Base 2 includes a rectangular-shaped base wall or panel 6 having a pair of spaced parallel end walls 7 and an upstanding front wall 8. A pair of positioning ribs 10 are formed on each end wall 7 and three positioning ribs 11 are formed on the inside surface of front wall 8, all of which extend into the hollow interior formed by walls 7 and 8 of base 2, which define a storage compartment 13. An elongated rail 15 is formed integrally on wall 6 and extends throughout a large portion of storage compartment 13 along base wall 6 parallel with front wall 8 generally adjacent hinge assembly 4. A plurality of positioning nubs 16 are formed on rail 15 and project into compartment 13, and together with the outer edges of ribs 10 and 11, define the space for receiving and positioning a video cassette tape (VHS) 18 in compartment 13 as shown in FIG. 6.

Walls 7 and 8 are spaced inwardly from outer edges 20 and 21 of base wall 6 to form a three-sided overhang 22 which extends around base 2. A pair of closure alignment ribs 24 may be formed on the inside surface of wall 7 closely adjacent hinge panel 4, and have rounded top ends which seat in concave cutouts 25 formed in lid 3.

Lid 3 includes a rectangular-shaped closure wall or lid panel 27 nearly identical in size and shape to base wall or panel 6 of base 2, and is partially surrounded by a pair of spaced parallel end walls 28 and a front wall 29. Walls 28 and 29 are formed with stepped shoulders 30 and 31, respectively, which extend throughout the length of the respective walls, and terminate in slightly recessed top wall sections 33 and 34, respectively. Walls 28 and 29 are inset from outer edges 36 and 37 of lid panel 27 in a similar manner as are walls 7 and 8 of base 2.

Figure 7:
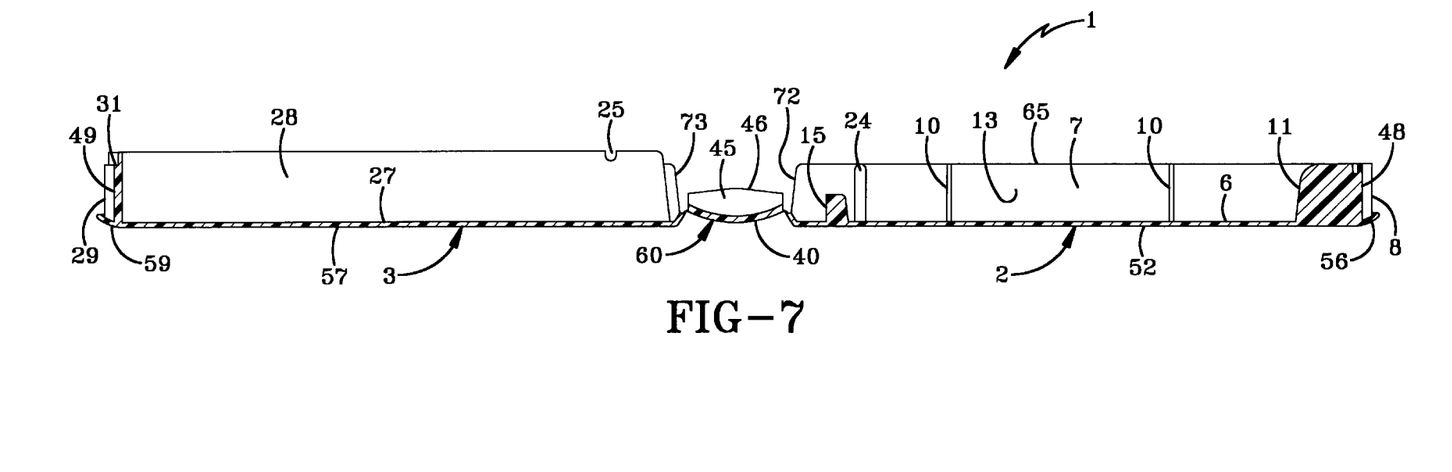
FIG. 7 is an enlarged sectional view taken on line 7—7, FIG. 6.
Figure 8:
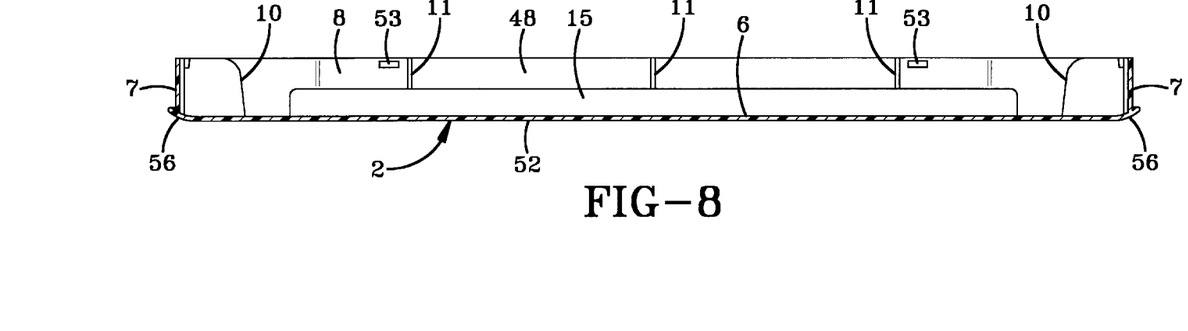
FIG. 8 is an enlarged sectional view taken on line 8—8, FIG. 6.

Hinge assembly 4 is a double-hinged panel arrangement comprising a substantially rectangular-shaped center panel 40 pivotally connected to base 2 and lid 3 by a pair of spaced parallel living hinges 41 and 42, respectively. In accordance with one of the features of the invention, hinge panel 40 has a slightly concave configuration, as shown in FIG. 7, and terminates in outer curved end edges 43. A small upstanding hinge closure end wall 45 is formed adjacent each end of hinge panel 40 and is spaced a slight distance inwardly from curved end edge 43, and has a somewhat triangular-shaped top edge 46.

In accordance with another feature of the invention, front walls 8 and 29 of base 2 and lid 3 are formed with slightly concave central portions 48 and 49, respectively, so that when in the closed position, as shown in FIG. 1, provide for larger grasping areas 50 and 51 of the overhang portions to facilitate the opening of the storage container, especially by smaller children who must grab these areas to pull the container apart.

In accordance with still another feature of the invention, a small pair of latching nubs 53 are formed on the inside surface of concave portion 48 of front wall 8 of base 2, and are snap-fitted and received within corresponding-shaped recesses 54 formed at the ends of concave recessed wall portion 34a of end wall 29. This avoids the use of large projections and socket members which heretofore extended into the storage area or compartment of the base, occupying usable space. Thus, the latching projections and recesses of storage container 1 do not decrease the available storage space and provide for a nearly unnoticeable latching arrangement.

In accordance with still another feature of the invention, the three peripheral edges 55 and 56 of outer surface 52 of base 2 are formed with smooth downwardly curved radius surfaces, as shown in FIGS. 1, 3, 4 and 5. Likewise, the three peripheral edges 58 and 59 of outer surface 57 of lid 3 also are curved in a similar radius manner as edges 55 and 56 of base 2. Curved edges 55, 56, 58 and 59, in combination with the outer curved exposed surface 60 of concave hinge panel 40, provide a very attractive storage container free of pointed corners which are subject to breakage during shipment and use.

Walls 7 and 8 of base 2 likewise are joined by smooth curved corners 62 which are similar in shape and contour to smooth curved corners 63 formed at the junction of end walls 28 and front wall 29 of lid 3. Corners 62 and 63, in combination with the curved outer three edges of the lid and base and the curved spine of hinge panel 40, provide the desired pleasing effect best shown in FIGS. 1, 4 and 5 of the drawings.

Figure 4:
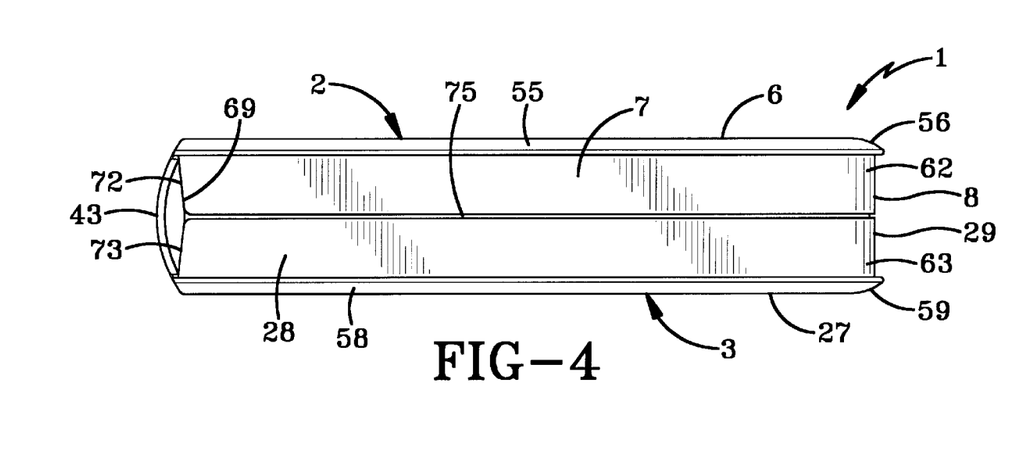
FIG. 4 is an end elevational view of the storage container in closed position, the opposite end being a mirror image.
Figure 5:
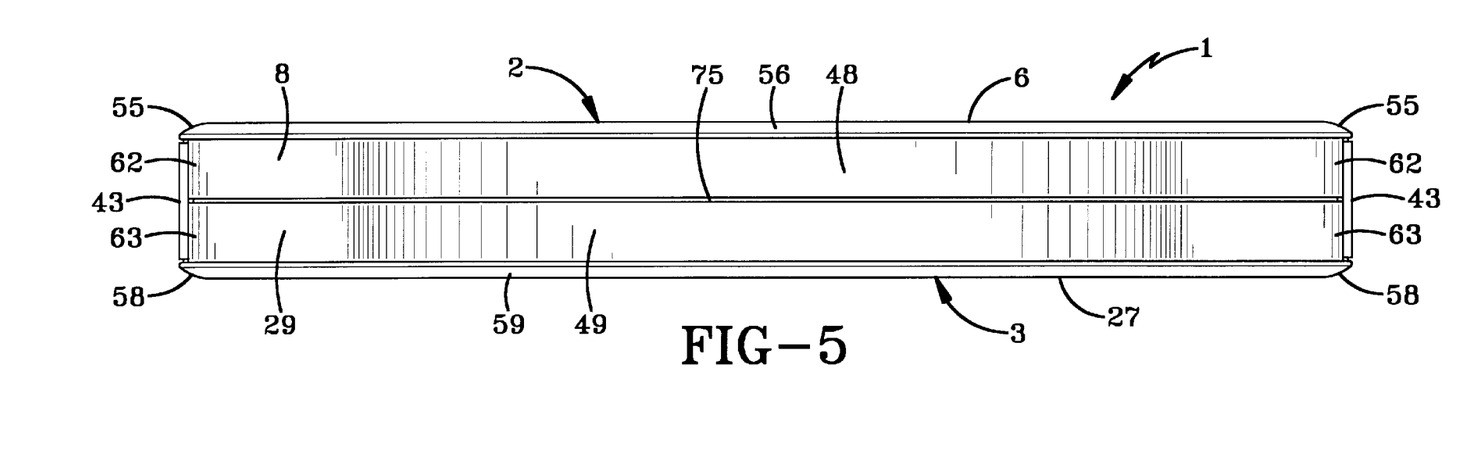
FIG. 5 is a front elevational view of the storage container in closed position.

In accordance with still another feature of the invention, the outer edges 65 of base side walls 7 and edge 66 of front wall 8, when moved to a closed position, slide along the outside surface of recessed wall portions 33 and 34, respectively, of lid walls 28 and 29 so as to provide generally smooth front and end walls of the container when in the closed position, as shown in FIGS. 4 and 5. When in the closed position, alignment ribs 24, if incorporated into container 1, will seat within concave cutouts 25 to ensure proper alignment of walls 7 and 8 outside of the recessed wall portions 33 and 34 of lid 3.

In further accordance with still another feature of the invention, hinge end walls 45 have an outer similar-shaped wall portion 68 (FIGS. 1, 2 and 4) which provides a somewhat triangular-shaped stepped shoulder 69 spaced slightly below triangular-shaped top edge 46 for receiving the end edges 72 and 73 of end walls 7 and 28, respectively, therein, when the base and lid are in the closed position, as best shown in FIG. 4. Thus, when moving toward the closed position, edges 72 and 73 will slide along the outer surfaces of the larger hinge end walls 45 and rest against stepped triangular-shaped shoulders 69 when in the fully closed position, as shown particularly in FIG. 4, to provide a further streamlined and pleasing appearance to container 1.

This hinge configuration ensures good closure of the base and lid, regardless of how the case is closed. Thus, both of the lid and base members can be moved toward each other simultaneously, or either of the members can be moved prior to the other member, as well as the directional movement of hinge panel 40, without affecting the smooth closure of the base and lid. Also, when in the closed position, outer edges 65 and 66 of base 2 will automatically move over the recessed wall portions 33 and 34 of lid 3, as discussed above.

In summary, storage container 1 is formed as an integral one-piece member of a plastic material, such as polypropylene, and together with the three smooth curved radiused edges of the base and lid and the rounded spine provided by hinge assembly 4, provide an extremely attractive container configuration which is less susceptible to damage during shipment and use, and which provides a sufficiently large internal storage compartment or chamber for containing a video cassette while providing an external configuration sufficiently large for storing and displaying advertising graphics.

Likewise, the improved appearance of container 1 is increased by the particular end wall configuration of the hinge panel assembly and its cooperation with the edges of the end walls of the base and lid. Also, the recessed area in the center portion of the front walls of the base and lid and the location of the latching nubs and recesses provides for a more attractive compact storage container which is easily unlatched than believed possible with known storage containers.

In accordance with another feature of the invention, as best shown in FIGS. 2 and 5, the end and front walls of the base and lid are equal to each other in height when end walls 28 and front wall 29 are measured from the stepped shoulder portion thereof. This provides a closure line 75 which is centrally located between base panel 6 and lid panel 27 as shown in FIGS. 1, 4 and 5, which adds to the attractive symmetrical appearance of container 1 when in the closed position.

Accordingly, video cassette storage container 1 provides an extremely attractive storage container which can be mass produced relatively inexpensively by plastic molding procedures as a one-piece member having the three rounded radiused edges on the outer surface of the base and lid, and having front rounded corners 62 and 63 and a rounded spine provided by the hinge assembly, and having a central closure line 75.

Figure 9:
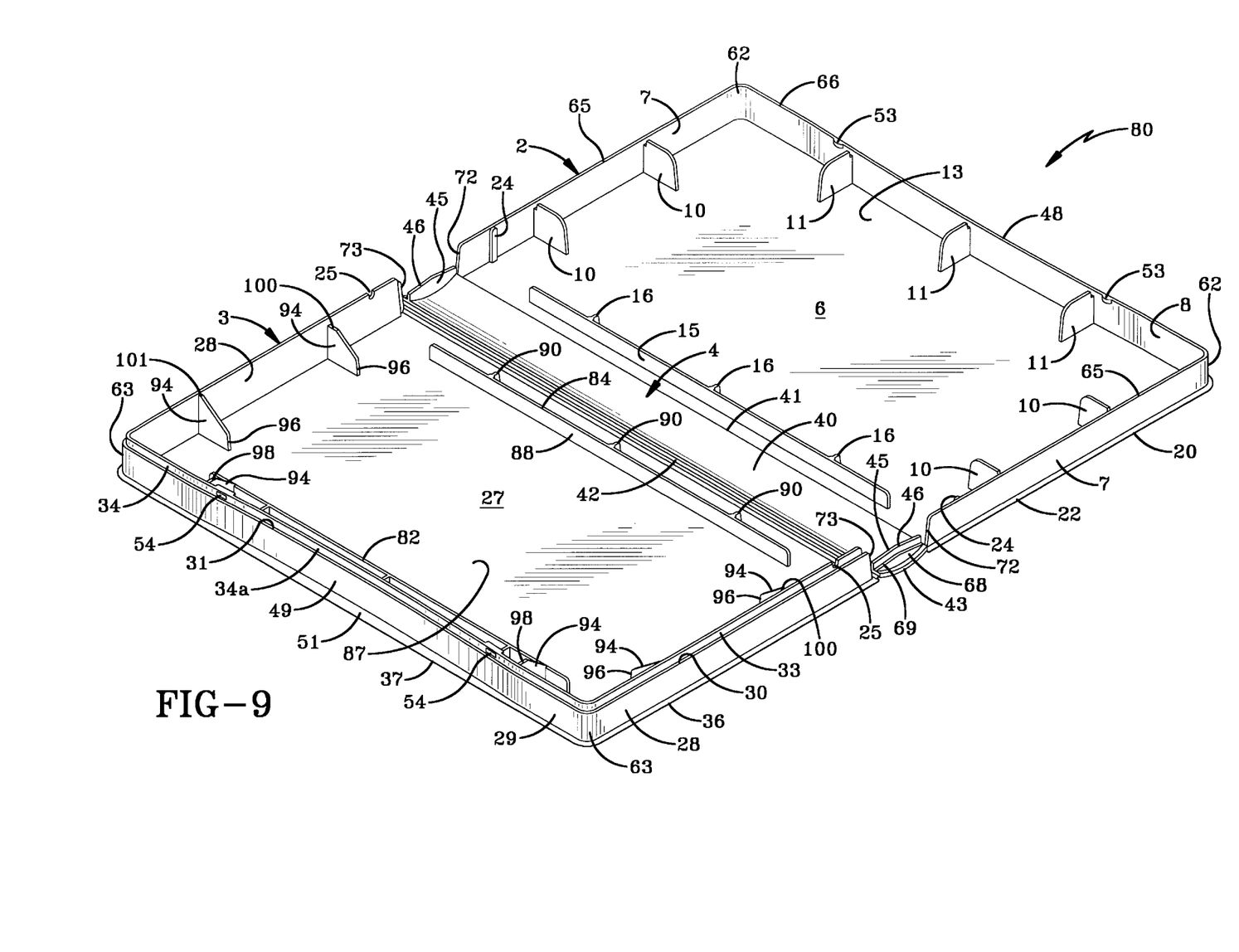
FIG. 9 is a perspective view showing a second embodiment of the video cassette storage container of the present invention in open position.
Figure 10:
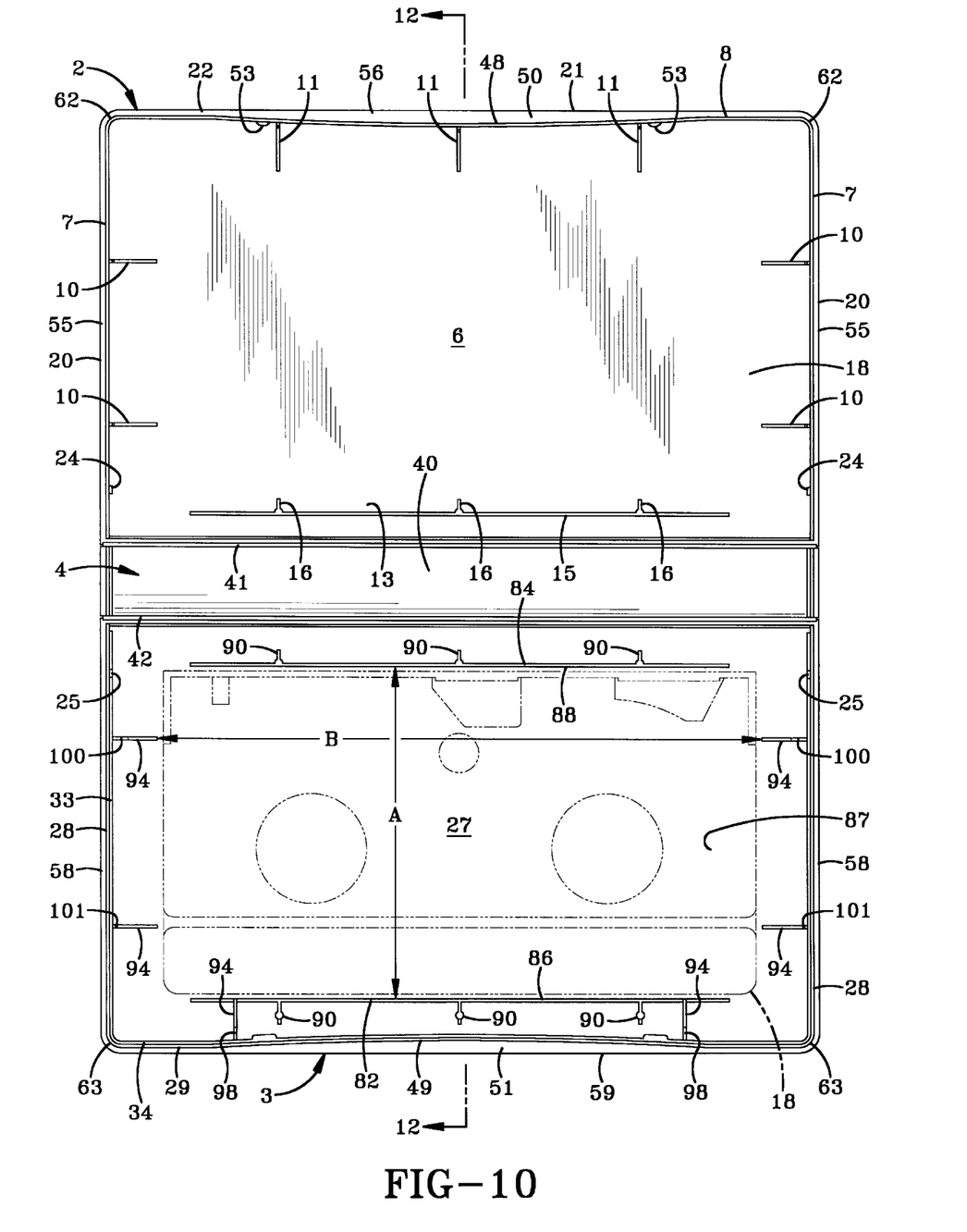
FIG. 10 is a plan view of the inner surface of the storage container of FIG. 9 with a video cassette shown stored therein in dot dash lines.

A second embodiment of the video cassette storage container is shown in FIGS. 9 and 10, and is indicated generally at 80. Container 80 is generally similar to container 1 in that container 80 includes base 2 hingedly connected to lid 3 by hinge assembly 4, and rail 15 formed integrally on wall 6 and extending along base wall 6 parallel with front wall 8 generally adjacent hinge assembly 4.

In further accordance with one of the features of this second embodiment, container 80 further includes a pair of spaced parallel guide rails 82 and 84 which are similar in structure to rail 15 and which extend longitudinally along the inner surface of lid panel 27 adjacent and parallel to front wall 29 and living hinge 42, respectively. Rails 82 and 84 form a VHS storage area 87 therebetween which is similar in size to the VHS storage area of compartment 13 of base 2. Rails 82 and 84 each include a smooth inner surface 86 and 88, respectively (FIG. 10), which oppose and face one another to allow VHS tape 18 and an associated literature booklet 89 (FIG. 11) to slide into storage area 87, as described below. Guide rails 82 and 84 are spaced apart by a distance "A" (FIG. 10) which is slightly greater than the transverse width of VHS tape 18 or approximately 4 3/16 inches. A plurality of support nubs 90 are formed on the outer surface of rails 82 and 84 to support and reinforce the integral connection of rails 82 and 84 to lid panel 27.

In accordance with another feature of the invention, a pair of spaced parallel, ramped or sloped ribs 94 are formed integrally with and extend inwardly from each end wall 28 and front wall 29. Ribs 94 are angled downwardly toward VHS storage area 87 and have a straight bottom edge 96 (FIG. 9). Ribs 94 of front wall 29 have a top edge 98, and extend from the inner surface of front wall 29 level with stepped shoulder 31 thereof to the outer surface of guide rail 82. Ribs 94 of front wall 29 are formed integrally with guide rail 82 and terminate at the top edge thereof forming a continuous smooth surface which extends from front wall 29 to guide rail 82.

Ribs 94 of end walls 28 are formed integrally with and extend inwardly from the inner surface thereof. The inner ribs 94 of end walls 28 are positioned generally adjacent guide rail 84 and have top edges 100 which are level with stepped shoulders 33 thereof. The outer ribs 94 of end walls 28 are positioned generally adjacent guide rail 82 and have smaller top edges 101 formed slightly below the top edge of top wall sections 33 of end walls 28. Bottom edges 96 of ribs 94 of one end wall 28 are separated from the bottom edges 96 of ribs 94 of the other end wall 96 by a distance "B" (FIG. 10) which is slightly greater than the longitudinal length of VHS tape 18 or approximately 7 7/16 inches. All ribs 94 extend angularly downwardly toward storage are 87 at a similar angle.

In accordance with one of the main features of this embodiment is that guide rails 82 and 84 and ramped ribs 94, center VHS tape 18 and literature 89 within VHS storage area 87 as storage container 80 is moved along a conveyor belt during the automated loading and packaging thereof. As container 80 travels along the conveyor belt, literature 89 and VHS tape 18 slide angularly by an appropriate delivery mechanism downwardly toward container 80.

Figure 11:
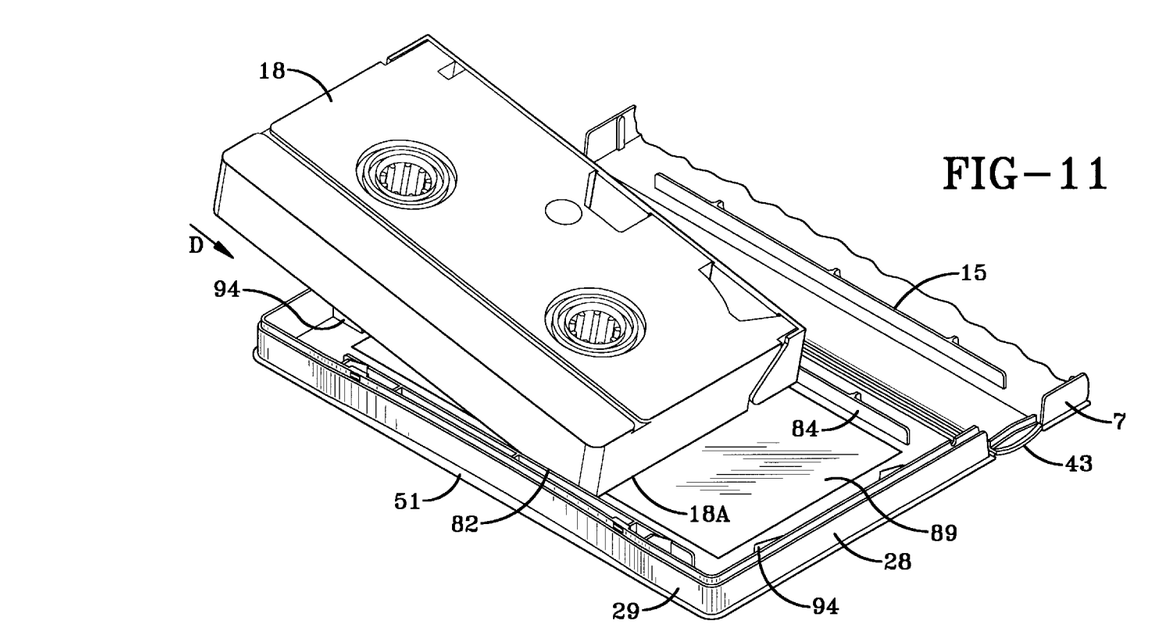
FIG. 11 is a fragmentary diagrammatic perspective view of the storage container of FIG. 10 showing a video cassette being loaded therein.
Figure 12:
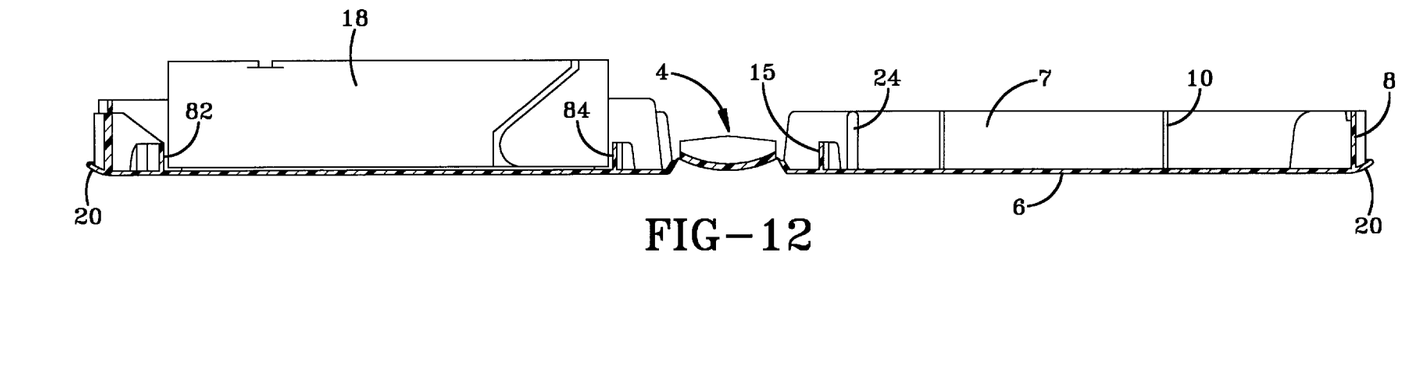
FIG. 12 is a sectional view of the storage container taken on line 12—12, FIG. 10.

Literature 89 is loaded upside down and is centered within VHS storage area 87 prior to the loading of VHS tape 18, as shown in FIG. 11. Literature 89 and VHS tape 18 are loaded into lid 3 in a similar manner and thus only the loading of VHS tape 18 will be described in detail. VHS tape 18 is positioned upside-down in a loading device and slides angularly in the direction of arrow "D", FIG. 11, toward container 80 and particularly toward lid 3 thereof. The release of VHS tape 18 from the loading device is timed such that tape 18 slides into VHS storage area 87 in a relatively central position between guide rails 82 and 84.

The leading edge 18*a* of VHS tape 18 slides in the direction of arrow D (FIG. 11) over the top edge of top wall section 33 of one end wall 28 and into contact with the literature resting on lid panel 27 and is guided into its stored position by ribs 94 and guide rails 82 and 84. The trailing edge of tape 18 will pass over wall section 33 and down ramped ribs 94, and the bottom edges 96 of ramped ribs 94 of the other end wall 28 stop the forward movement of tape 18 causing tape 18 to come to a rest upside-down within VHS storage area 87 of lid 3 as shown in dot dash lines in FIG. 10.

Guide rails 82 and 84 and ramped ribs 94 centrally position tape 18 within storage area 87 between guide rails 82 and 84. If tape 18 slides off-center toward the outer surface of guide rail 82, the tape will be angled inwardly toward storage area 87 and wall 29. Ribs 94 and guide rail 82 will funnel or guide the tape into VHS storage area 87 as the tape slides forward. Similarly, if tape 18 is off-center toward the outer surface of guide rail 84, the tape will be angled toward storage area 87 and guide rail 84 will funnel or guide the tape into VHS storage area 87 as the tape slides forward. Thus, the smooth surfaces of guide rails 82 and 84, ramped ribs 94 and the forward movement of tape 18 and the force of gravity cooperate to funnel or guide the tape into VHS storage area 87, automatically centering the tape therein, when the tape is loaded into storage container 80 for packaging and shipment.

After VHS tape 18 has been centrally positioned within VHS storage area 87 of lid 3, base 2 is moved to the closed position similar to that shown in FIG. 1. When storage container 80 is in the closed position, positioning ribs 10 and 11 and rail 15 of base 2 centrally position tape 18 within storage compartment 13. Ribs 10, 11 and 94, and rails 15, 82 and 84 retain VHS tape 18 centrally within storage container 80 and prevent excessive sliding movement of the tape within the storage container during transportation of the container to retail stores or by a consumer during everyday use.

The upside down loading of literature 89 and VHS tape 18 into lid 3 allows base 2 to be pivoted about hinge assembly 4 to place storage container 80 in the closed position. The title and associated graphics of VHS tape 18 is placed on the outer surface of lid panel 27, and thus lid 3 will usually be pivoted or moved away from base 2 to the open position exposing the literature and VHS tape in the right side up position, with literature 89 being on top of tape 18 for viewing the contents of VHS tape 18 prior to the tape being played in a VHS player.

The inclusion of ribs 10, 11 and 94 and guide rails 15, 82 and 84 on base 2 and lid 3 assure that VHS tape 18 will be centrally and stably positioned regardless of which of the base or lid is pulled away from the other of the base or the lid during opening of storage container 80. If lid 3 is unlatched from base 2 and pivoted to the open position, VHS tape 18 will be positioned between ribs 10 and 11 and rail 15 of base 2. Similarly, if base 2 is unlatched from lid 3 and pivoted to the open position, VHS tape 18 will be centrally positioned between ribs 94 and guide rails 82 and 84 in an upside down yet stable position.

Accordingly, storage container 80 provides an easy loading storage container which automatically guides VHS tape 18 and centrally positions the tape within storage area 87 during the loading and packaging thereof. Ramped ribs 94 of one end wall 28 allow the VHS tape to cam thereon and slide into lid 3 while ramped ribs 94 of the other end wall 28 act as stops to stop the forward movement of the VHS tape. Guide rails 82 and 84 guide or funnel the tape therebetween in the event that tape 18 is slightly off-center when entering VHS storage area 87. The automatic centering of VHS tape 18 by the guide rails and adjacent ramped ribs allows the conveyor belt on which storage container 80 travels to move at a faster rate and eliminates the need for an operator to manually centrally position the tapes within the storage container, as required by many prior art storage containers. The increased speed of the conveyor belt increases the number of VHS tapes which can be loaded and packaged for shipment in a given period of time which, in turn, increases the sales thereof, since millions of such tapes are loaded yearly into such containers, and this number is ever increasing.

Figure 13:
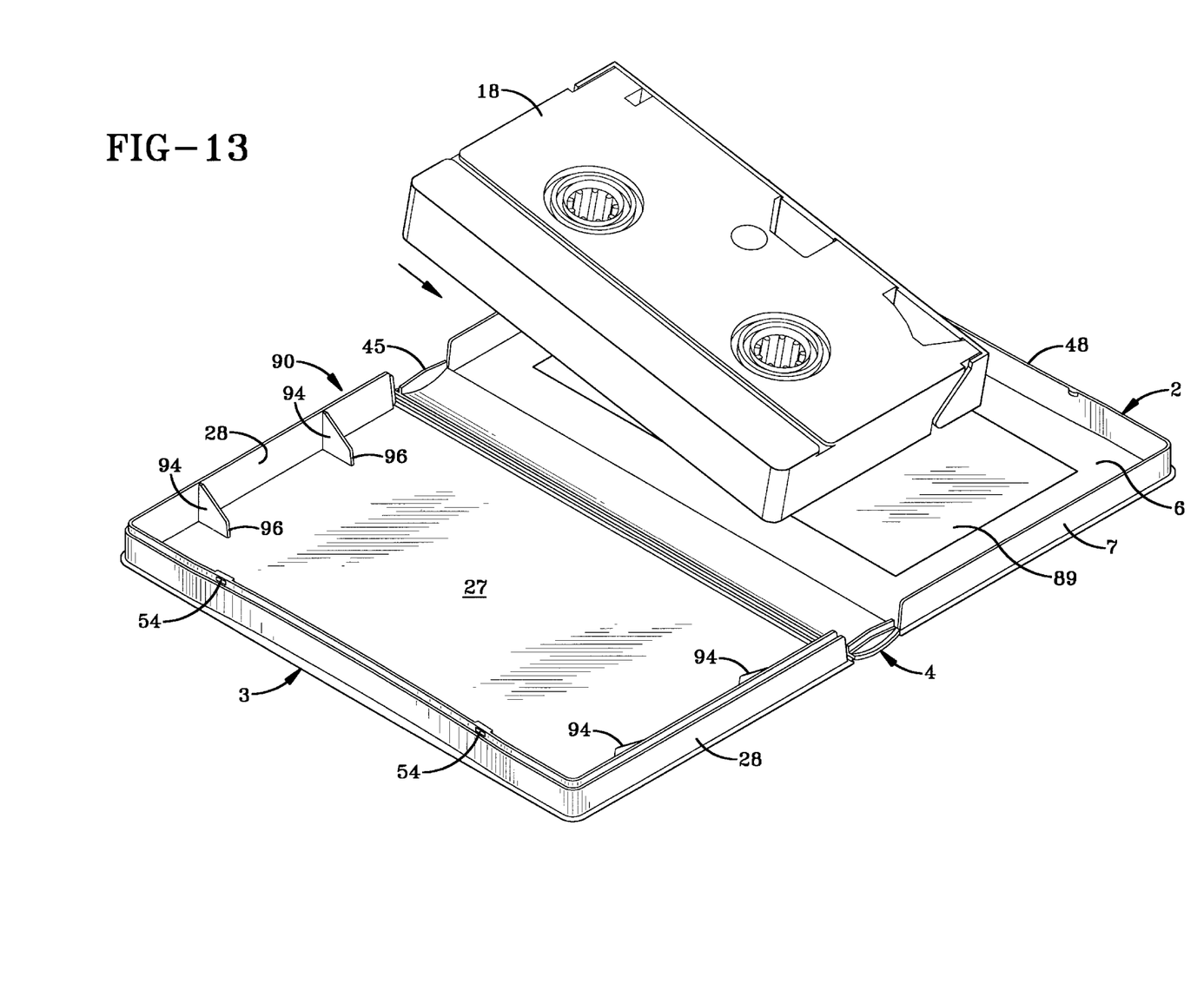
FIG. 13 is a fragmentary perspective view similar to FIG. 11 showing a video cassette being loaded within a modified storage container.

A third embodiment of the present invention is indicated generally at 90 and is shown in FIG. 13. Container 90 is similar to containers 1 and 80 described above with the main difference being that it is free of internal ribs 11 and 15 as well as guide rails 82 and 84.

It is been found that the use of ribs 94 on end walls 28 are sufficient to satisfactorily load cassette 18 therein upon closure of lid 3. Thus, as shown in FIG. 13, cassette 18 can be automatically fed into base 2 in a similar manner as described above and shown in FIG. 11, on top of a previously loaded piece of literature 89. Upon pivotal closure movement of lid 3, ribs 94 will engage the edges of VHS tape 18 centering it between the edges 96 of the ribs. Thus, tape 18 is secured in its longitudinally direction but could move slightly in the transverse direction unless additional longitudinally extending ribs, similar to rib 15 are incorporated therein, although the same need not be utilized to provide for the automatic loading and centering of the cassette tape within the storage chamber formed between base 2 and lid 3 when in a closed position.

It is readily understood that the lid and base as discussed above can be reversed as to the location of the various guide rails and ribs without affecting the concept of the invention.

Accordingly, the video cassette storage container is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which improved video cassette storage container is constructed and used, the characteristics of the construction, and the advantageous, new and useful results obtained; the new and useful structures, devices, elements, arrangements, parts and combinations, are set forth in the appended claims.

We claim:

1. A storage container for storing an article, said storage container including:
   a base having a bottom wall, a pair of spaced end walls and a front wall;
   a lid having a bottom wall, a pair of spaced end walls and a front wall hingedly mounted on the base and movable between open and closed positions on said base, said base and lid forming a storage chamber therebetween, when in the closed position;
   guide means formed on certain of the walls of the lid and extending into the storage chamber for guiding the article into the storage chamber, said guide means including a pair of spaced elongated guide rails formed on the bottom wall of the lid and extending in a longitudinal direction between the end walls and a plurality of sloped ribs extending from the end walls of the lid and into the storage chamber.

2. The storage container defined in claim 1 in which the guide rails are substantially parallel to one another.

3. The storage container defined in claim 1 in which the guide means further includes a pair of sloped ribs formed on each of the end walls of the base and extending into the storage chamber.

4. The storage container defined in claim 3 wherein the sloped ribs of the base and lid are aligned with each other.

5. The storage container defined in claim 4 wherein the sloped ribs terminate in substantially straight edges adjacent the bottom wall for positioning the article therebetween.

6. The storage container defined in claim 1 further including a third rail extending longitudinally along the bottom wall of the base for centering the article within the storage chamber.

7. The storage container defined in claim 6 further including a plurality of positioning nubs extending from an inner surface of the third rail.

8. The storage container defined in claim 1 further including a hinge assembly hingedly mounting the lid on the base.

9. The storage container defined in claim 8 in which the base, hinge assembly and lid are formed as an integral one-piece member of a plastic material.

10. The storage container defined in claim 1 in which the end walls, side walls and front walls of the base and lid are substantially equal to each other and form a closure line when in the closed position substantially midway between the bottom walls of said base and lid.

11. The storage container defined in claim 1 in which each of the bottom walls of the base and lid terminates in a U-shaped peripheral edge having a smooth downwardly curved radius surface.

12. An improved storage container for storing articles includes a first storage compartment hingedly connected to a second storage compartment and movable between open and closed positions relative to said second storage compartment, said first and second storage compartments each having a bottom wall, a pair of spaced end walls and a front wall, and form a storage chamber when in the closed position, said improvement including:
   a pair of spaced elongated guide rails formed on the bottom wall of the first storage compartment and extending longitudinally along an inner surface of said first storage compartment for guiding the articles into the storage chamber; and
   a plurality of ramped ribs extending from an inner surface of at least one of the end walls of the first storage compartment.

13. The improved storage container defined in claim 12 in which each guide rail includes a smooth inner surface.

14. The improved storage container defined in claim 12 in which the guide rails are substantially parallel to one another and are spaced apart by approximately 4 3/16 inches.

15. The improved storage container defined in claim 12 in which a pair of the ramped ribs extend from each end wall and the front wall of the first storage compartment.

16. The improved storage container defined in claim 12 further including a third rail extending longitudinally along an inner surface of the second storage compartment for guiding the articles within the storage chamber.

17. The improved container defined in claim 16 further including a plurality of positioning nub extending from an inner surface of the third rail.

18. The improved container defined in claim 12 further including a plurality of sloped ribs extending inwardly from the end walls and front wall of the second storage compartment.

19. In combination, a VHS tape and a storage container for storing said tape, said container includes
   a base having a bottom wall, a pair of spaced end walls and a front wall;
   a lid hingedly mounted on the base and movable between open and closed positions on said base, said base and lid forming a storage chamber therebetween when in the closed position; and
   guide means formed on certain of the walls of the lid extending into the storage chamber for guiding the VHS tape into the storage chamber and a pair of spaced elongated guide rails formed on a bottom wall of the lid and spaced apart a distance equal to a transverse width of the VHS tape.

20. The combination defined in claim 19, in which a third guide is formed on the bottom wall of the base and aligns with one of the guide rails on the lid when the container is in the closed position.

21. The combination defined in claim 19, wherein the guide means includes a pair of spaced ribs formed on each of the end walls of the lid; in which said ribs have end edges; and in which the end edges of the ribs located on opposite end walls are spaced apart a distance equal to a longitudinal length of the VHS tape.

22. An improved tape cassette storage container including
   a base having a bottom wall, a pair of spaced end walls and front wall;
   a lid having a bottom wall, a pair of spaced end walls and a front wall hingedly mounted on the base and movable between open and closed positions on said base, said base and lid forming a storage chamber therebetween when in the closed position;
   a hinge assembly hingedly mounting the base and lid for movement between the open and close positions; and
   said end walls and front walls of the base and lid being substantially equal to each other and forming a closure line when in the closed position substantially midway between the bottom walls, and each of the bottom walls of the base and lid terminates in a U-shaped peripheral edge having a smooth downwardly curved radius surface and the front walls of the base and lid being formed with a concave recess in a central portion thereof.

23. The tape cassette storage container defined in claim 22 in which the hinge assembly includes an elongated hinge panel connected to the base and lid by a pair of spaced parallel living hinges, said hinge panel having a concave configuration and terminating in outer curved edges, and having an upstanding end wall formed adjacent each of said curved edges and spaced inwardly therefrom to provide a hinge closure wall when the container is in the closed position.

24. The tape cassette storage container defined in claim 23 in which each of the hinge closure walls have a stepped shoulder and receives a portion of one of the end walls of the base and lid when the container is in the closed position.

25. The tape cassette storage container defined in claim 24 in which the hinge closure walls have a generally triangular shape.

26. The tape cassette storage container defined in claim 22 in which the curved peripheral edges of the base and lid extend beyond the end and front walls and form a U-shaped overhang extending about three sides of the container.

27. A storage container for storing an article, said storage container including:

a base having a bottom wall, a pair of spaced end walls and a front wall;

a lid having a bottom wall, a pair of spaced end walls and a front wall hingedly mounted on the base and movable between open and closed positions on said base, said base and lid forming a storage chamber therebetween, when in the closed position; and guide means formed on certain of the walls of the lid and extending into the storage chamber for guiding the article into the storage chamber, said guide means including a pair of spaced elongated guide rails formed on the bottom wall of the lid and extending in a longitudinal direction between the end walls and a third rail extending longitudinally along the bottom wall of the base for centering the article within the storage chamber.

* * * * *